United States Patent [19]

Percival et al.

[11] Patent Number: 5,301,004
[45] Date of Patent: Apr. 5, 1994

[54] METHOD AND APPARATUS FOR DETERMINING THE OPTICAL PROPERTIES OF A LENS

[75] Inventors: Christopher J. Percival, Williamsville; David A. Luce, Clarence Center, both of N.Y.

[73] Assignee: Leica Inc., Buffalo, N.Y.

[21] Appl. No.: 850,890

[22] Filed: Mar. 13, 1992

[51] Int. Cl.$^5$ .............................................. G01B 9/00
[52] U.S. Cl. ........................................ 356/125; 356/127
[58] Field of Search ........................ 356/124, 125, 127

[56] References Cited

U.S. PATENT DOCUMENTS

| | | | |
|---|---|---|---|
| 3,880,525 | 4/1975 | Johnson | 356/127 |
| 4,275,964 | 6/1981 | Vassiliadis | 356/127 |
| 4,828,385 | 5/1989 | Fukuma et al. | 356/127 |
| 5,123,735 | 6/1992 | Hegarty | 356/125 |

FOREIGN PATENT DOCUMENTS 0366357 5/1990 European Pat. Off. .
3200037 7/1983 Fed. Rep. of Germany .

OTHER PUBLICATIONS

Vol. 9, No. 224 (P-387) (1947) Sep. 10, 1985, JP, A, 60-82830 (Canon K.K.) May 11, 1985.
Vol. 11, No. 134 (P-571) (Apr. 28, 1987), JP, A, 61-275710 (Hoya Corp.) Dec. 5, 1986.

*Primary Examiner*—Richard A. Rosenberger
*Attorney, Agent, or Firm*—Bean, Kauffman & Spencer

[57] ABSTRACT

Optical properties of a lens, including localized defects, are determined by analyzing the refracted image produced by transmitting a beam of light through an aperture and a lens to be tested. The image is reflected onto a light sensitive detecting surface. Information obtained from the light detecting surface is digitized and sent to an Image Processing Unit which calculates the optical properties of the lens. The aperture may consist of a single shaped opening or alternatively a plurality of concentric, annular rings. Correction lenses may be employed, either permanently or selectively, to alter the refracted beam before the beam intersects the detecting surface.

56 Claims, 3 Drawing Sheets

METHOD AND APPARATUS FOR DETERMINING THE OPTICAL PROPERTIES OF A LENS

BACKGROUND OF THE INVENTION

The present invention relates to apparatus and methods for determining the optical parameters of a lens, and more particularly to a method and apparatus for automatically and objectively obtaining measurements of such parameters.

In the past, to determine the quality of ophthalmic lenses, manufacturers have had to rely upon testing devices which require a good deal of subjective determinations by the operator of the testing device. One such typical measuring instrument, which requires careful manipulation of the lens and continual subjective evaluations, is disclosed in U.S. Pat. No. 1,383,678 to Tillyer et al. Because of having to rely on the subjective evaluations of each operator, differences in the readings acquired from operator to operator are encountered. Further, a relatively long period of time is required for even experienced operators to make an accurate measurement. Consequently, in order to measure the large quantities of lenses encountered in a production environment, a large number of operators is required.

Various attempts have been proposed in the prior art to alleviate these difficulties. One such method illuminated a test lens with collimated light, while behind the lens was placed an opaque mask containing two small holes symmetrically placed with respect to the axis of the system. The mask selects two bundles of rays from the refracted bundle passing through the lens. After first determining the separation of these bundles at some point down stream, the lens power of the lens could be calculated given the geometry of the optical system. However, this method is only useful for testing lenses having only spherical power, and also utilizes a moving part, namely a rotating chopper wheel having a slit therein, to determine the separation of the bundles.

U.S. Pat. No. 3,880,525 discloses a lens measuring device without moving parts that relies on the effect of a lens upon at least three small bundles of light. An analysis of the direction and amount of displacement of the bundles permits the sphere, cylinder and axis of the lens to be calculated. However, the repeatability and accuracy of devices of this type, as well as other commercial lens measuring devices, is dependent upon the curvature uniformity and surface quality of the lens. Furthermore, this device could not be relied upon to detect isolated defects in the lenses.

It would be advantageous to devise a method and apparatus, utilizing no moving parts, which is capable of consistently and easily providing objective measurements of the optical properties of lenses, including the ability to detect isolated defects, if so desired.

SUMMARY OF THE INVENTION

The present invention relates to a method and apparatus, utilizing no moving parts, for automatically obtaining objective measurements which can be used to determine various optical properties of lenses, particularly ophthalmic lenses.

In accordance with the present invention, a unique instrument is provided for determining the optical properties of a lens, and includes an illuminating source for projecting a beam of light through the lens to be tested and onto a flat detecting apparatus, for example a sensing surface containing a plurality of light sensitive pixels. The sensing surface is preferably large enough to intersect the entire area of the projected beam after it has exited the test lens. From the size and geometric shape of the projected light distribution on the sensor surface, optical properties of each lens may be calculated, such as, for example, the sphere and cylinder power and axis of cylinder power. By monitoring the intensity detected by individual pixels relative to the intensities detected by neighboring pixels, localized optical defects in the test lenses may be detected. One or more flip-in correction lenses may be employed to adjust the size of the projected image to fit sufficiently onto the sensing surface when very high or low power lenses are tested. An aperture is preferably employed between the light source and detector apparatus to convert the collimated beam of light to a particular shape and size. The aperture may comprise a single shaped opening or, alternatively, a plurality of concentric openings. The size and shape of the aperture is not critical, but for ease of manufacture circular apertures are preferred.

The aperture is preferably located between the lens to be tested and the detecting apparatus. When testing a particular lens, the lens is preferably located against the aperture. However, for some lenses it is not critical that the lens be placed directly against the aperture, nor is it always necessary that the collimated beam pass through the lens prior to passing through the aperture. For example, with some lenses, the beam of light could travel first through the aperture and then through the lens to be tested, without departing from the spirit and scope of the invention. Similarly, if the collimated beam is of a certain diameter relative to the lens, and results in a narrow enough refracted beam, it is conceivable that the aperture might be omitted altogether without affecting the operation of the invention.

BRIEF DESCRIPTION OF THE DRAWINGS

The nature and mode of operation of the present invention will now be more fully described in the following detailed description taken with the accompanying drawings, in which.

DETAILED DESCRIPTION

Figure 1:
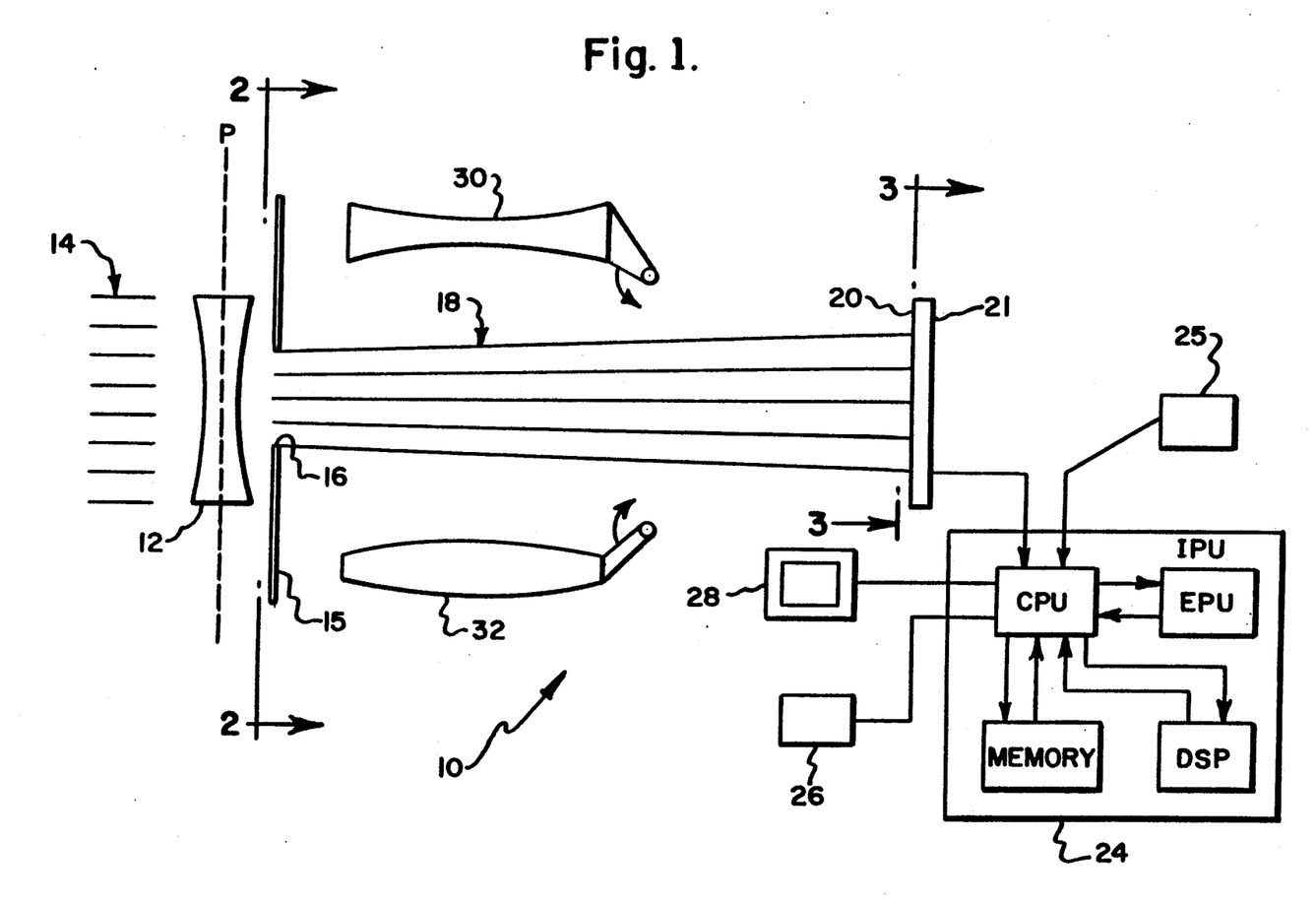
FIG. 1 is a schematic diagram of an automatic lensometer in accordance with the present invention showing a lens in position to be tested.
Figure 2:
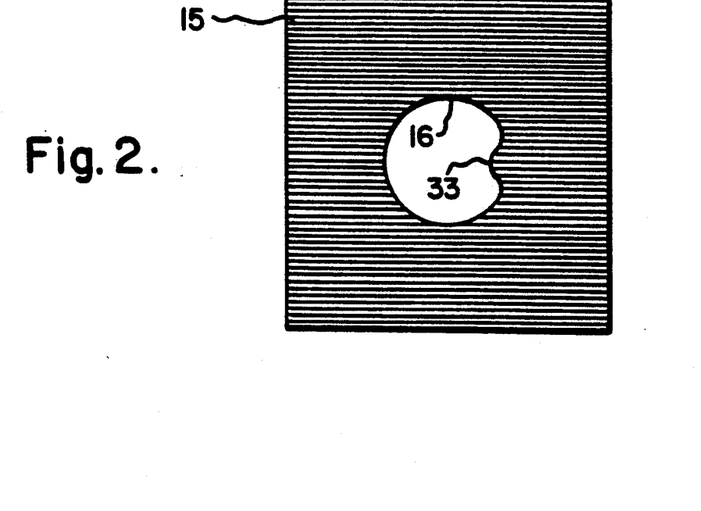
FIG. 2 is a sectional view taken along line 2—2 of FIG. 1, illustrating an aperture with an exaggerated defect.
Figure 4:
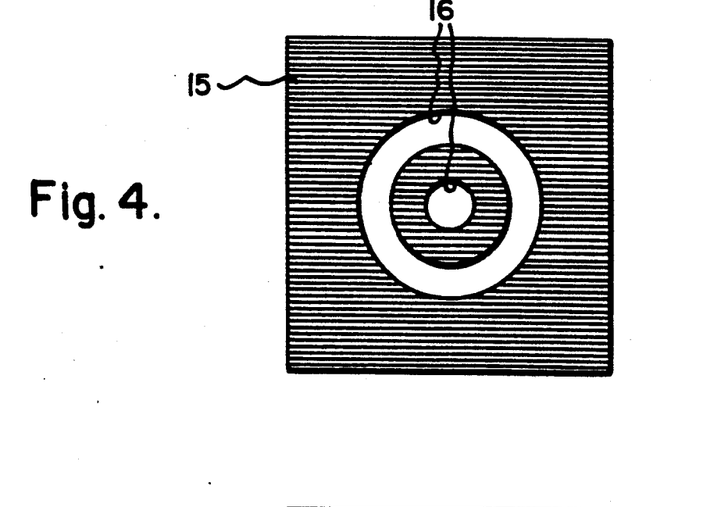
FIG. 4 is a sectional view taken along line 2—2 of FIG. 1, illustrating an alternative embodiment of aperture having a plurality of annular rings.

Referring initially to FIG. 1, there is shown apparatus 10 for determining various optical properties or characteristics of lens 12. In the preferred embodiment, collimated beam of light 14 is produced and directed through test plane P and mask or occluder 15 having pinhole aperture 16. The collimated light beam may be provided, for example, by a collimating light beam source, for example by utilizing a radiant light source and collimating the radiant light emitting from the light source using one or more collimating lens. Alternatively, a laser may be employed. As illustrated in FIG. 2, aperture 16 is preferably elliptical, and most preferably circular. Alternatively, aperture 16 may consist of a plurality of concentric annular rings, as illustrated in FIG. 4. Preferably, lens 12 is positioned at or near test plane P, substantially perpendicular to the collimated beam of light 14 and preferably against the side of aperture 16 which faces the source of collimated light beam 14. In this way, collimated beam of light 14 passes through lens 12 and is refracted before passing through aperture 16. As mentioned above, the lens is preferably located against the aperture opening. However, with some lenses, such as the bi-concave lens illustrated in FIG. 1, it may be difficult for the lens to contact the aperture portion of the occluder, because its outer edges will contact the occluder first. One solution to this problem is using curved occluders, so that even a concave surface will be able to be positioned against the aperture.

Figure 3:
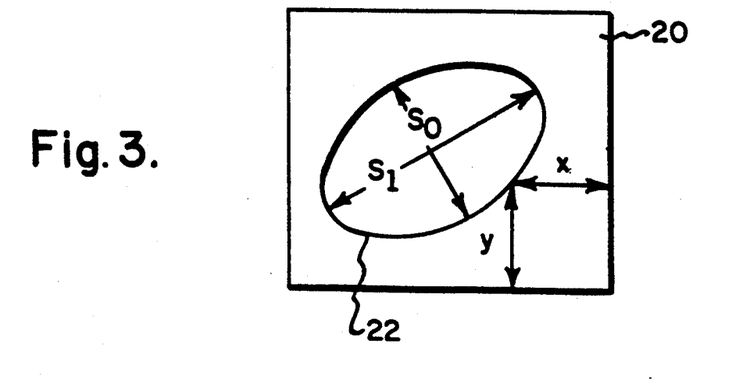
FIG. 3 is a sectional view along line 3—3 of FIG. 1, illustrating a typical elliptical refracted image projected on a sensor surface, produced by a lens having cylindrical and spherical powers.

In accordance with a preferred embodiment of the invention, after collimated beam 14 is refracted by passing through lens 12, a portion of the refracted beam is blocked as it travels through occluder 15, resulting in refracted beam 18. A light detecting or sensor surface 20 is provided as an area detection means a known distance from aperture 16 and in the path of refracted beam 18. Sensor surface 20 may be, for example, the front surface of a photosensitive device 21, such as, for example, a charge couple device (CCD), a charge injection device (CID), a vidicon, etc., having a plurality of light sensitive areas thereon. A preferred photosensitive device, illustrated in the drawings, is a CCD 21 having a plurality of light sensitive pixels thereon. Refracted beam 18 is projected onto sensor surface 20, which is preferably oriented substantially perpendicular to the axis of lens 12 and collimated beam 14 and substantially parallel to the plane in which aperture 16 is located. The distance from the aperture 16 to the sensor surface 20 is critical, since this distance will affect the size of the projected image 22. For a given combination of aperture 16, sensor surface 20, and lens 12 to be tested, the sensor surface 20 preferably should be capable of intersecting at least a substantial portion of the area of the resultant refracted beam 18. It is not necessarily critical that the entire refracted beam be intersected, as long as a large enough portion of the beam is intersected to enable extrapolation of the remainder of what would be the entire projected image. As illustrated in FIG. 3, refracted beam 18 projects image 22 onto sensing or detecting surface 20. The light distribution of image 22 is representative of the lens through which the collimated light beam was refracted. Image 22 is generally circular for purely spherical lenses, and elliptical, as illustrated in FIG. 3, for lenses containing cylinder. In the case illustrated in FIG. 3, since refracted image 22 is an ellipse, lens 12 may have both spherical and cylindrical power.

The information gathered by each pixel of the sensor surface 20 of photosensitive device 21 is preferably converted to a digitized signal, which signal indicates whether or not the individual pixel has intercepted any refracted light, and the relative intensity of the light received by each individual pixel. Then, by knowing the size and shape of the pixels, the size and shape of projected image 22 may be calculated. By knowing the size and shape of the image 22 formed by the collimated and occluded beam of light before a lens is on the path, and comparing the signal representing this image with the signal representing the image 22 formed by refraction of this beam after the lens has been inserted on the path, the properties of the lens being tested may be calculated.

Thus, the information gathered by CCD 21 is preferably digitized and may be used to provide reference information on the shape of image 22, both with and without a lens at the test plane. This digitized information may then be used to calculate properties of the lens being tested. For example, the calculations may be performed by one or more CPUs (central processing units) and/or co-processors, such as conventional personal computers or micro-controllers, such as are available from Intel or Motorola, etc. In a preferred embodiment of the invention, the information gathered by the sensor surface is digitized and sent to an image processing unit, or IPU 24, which preferably consists of three portions: a central processing unit or CPU, a digital signal processor or DSP and a custom elliptical processing unit or EPU portion, described further hereinbelow. In a preferred embodiment, the EPU and DSP portions are math co-processors which perform certain mathematical calculations on the digitized information under the control of the CPU. The digitized information is preferably processed first by the EPU, then the DSP, after which the information resulting from the calculations performed by these two co-processors is reported by the CPU. A keypad or keyboard 25 is typically connected to control IPU 24 in conjunction with the lens measuring apparatus. The keyboard 25 may be a conventional computer keyboard, or, preferably, has only the number of keys needed to perform the necessary communications for the particular design of lensometer being used, such as, for example, a key for zeroing, a key to instruct the sensor board when to send digitized information to the IPU, a series of keys telling the apparatus what to measure, or how to present the data, etc. The particular keyboard configuration may vary depending on the functions desired by the designer. The IPU 24 has information and equations stored therein, and implements algorithms, described further hereinbelow, which enable it to examine the area of projected image 22 and calculate optical properties of lens 12 using the information supplied by CCD 21. After the optical properties have been calculated, they may be reported, if desired, using a printer 26 or a visual display monitor 28, or stored in suitable computer memory for future reference and comparison, or any combination of these.

When designing the invention to measure the optical properties of lenses within a particular range of powers, such as, for example, ±10 diopters, sensor surface 20 preferably should be large enough to receive the refracted images 22 from any lens in this range. Alternatively, modifying or correction flip-in lens 30, 32 may be employed to magnify or demagnify the refracted beam so the projected image 22 will fit adequately on the sensor surface 20, thereby providing the instrument with a larger range of powers, such as, for example, ±20 diopters. Thus, a first positive magnifying flip-in lens 30 could be utilized to reduce the size of the image 22 produced by lenses more negative than about −10 diopters, while a second negative demagnifying flip-in lens 32 could be utilized to increase the size of the image 22 produced by test lenses being more positive than about +10 diopters. By knowing or determining how much the size of the refracted beam impinging on the sensor surface was changed or adjusted using the particular flip-in lens (i.e., magnified or demagnified) the properties may then be calculated as usual.

A modifying or correction lens could also be permanently mounted in the system, preferably between the aperture and sensor surface, to permanently alter an aperture or sensor surface to compatibility with one another. For example, a variety of sensors are available which have rectangular pixels rather than square pixels. Obviously, utilizing rectangular pixels on the sensor surface would ordinarily create differences in detecting accuracy, depending on which direction along the pixel a measurement was being taken. However, by permanently installing a correction lens between the aperture and the sensor board, the refracted or collimated beam may be altered sufficiently so that these rectangular pixels and sensor board function as if they were square pixels and a square sensor board. The aperture size may thus be manufactured more independent of the sensor surface size, or the sensor surface manufactured more independent of aperture size, the correction lens 30 or 32 being used to adjust the image size accordingly.

Figure 5:
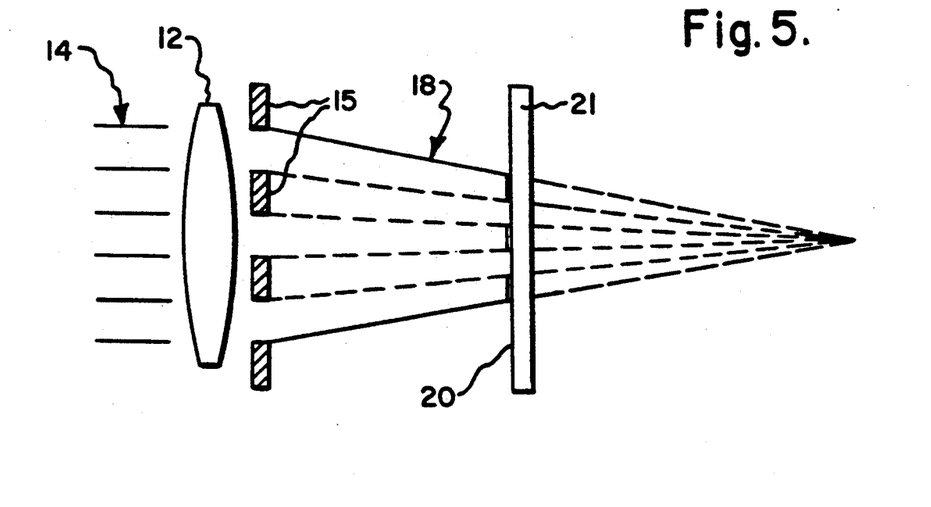
FIG. 5 is a schematic view illustrating the convergence of light by a positive lens through an aperture of the type illustrated in FIG. 4 and onto the sensor surface.

An alternative solution to the situation where the projected image 22 does not fit adequately on the sensor surface is to utilize an occluder 15 having a plurality of concentric annular rings, as illustrated in FIGS. 4 and 5, each ring blocking a different portion of the beams 14 and/or 18. In this way, when positioned correctly in the manner generally illustrated in FIGS. 4 and 5, the smaller aperture rings may be used to analyze either strongly negative or weakly positive lenses, while the outer ring may be used to analyze either strongly positive or weakly negative lenses. For example, as lenses become increasingly more convergent (i.e., increasing negative strength), the inner ring would become smaller and smaller, until it is so small the individual pixels will not detect it, in which case, for purposes of measuring properties, it would cease to be adequate, and in which case the image produced by the outer ring could be analyzed instead. For some lenses it is conceivable that the opening of either ring could be used, as both would cast an image 22 on the sensor surface 20.

Since the area of the projected image 22 formed by one beam is evaluated, as opposed to merely measuring the distance and direction the lens diverts a plurality of refracted light beams, as in the prior art, more information about each lens 12 can be gathered than with prior art devices. For example, small defects in lenses, which were not detectable using most prior art devices, many times may be detected using the present invention since these defects will refract more or less light than areas of the lens surrounding the small defect. Therefore, by monitoring the individual intensity received by each pixel and comparing this intensity to surrounding pixels, detection of localized defects in each lens is possible. For example, defects including but not limited to gaseous inclusions, air bubbles, as well as scratches and other surface defects may be detected using the present invention.

Another perhaps more important advantage over the prior art is that small, uneven or defective areas in the lens (or dirt on the surface of the lens) will not grossly alter the evaluated lens properties. Conversely, in the above mentioned prior art devices, if one of the plurality of refracted light beams intersected a localized defective area of the lens, or dirt, etc., the overall properties of the lens reported would be severely altered.

Two problems with pinhole occluder and other types of apertures is that they may not always be perfectly round and, even if perfectly round, they may not be perfectly perpendicular to the collimated light source. For example, in FIG. 2 a pinhole occluder is illustrated having a defect 33 (exaggerated for purposes of illustration). The error in measurements created by defects in aperture shape may be eliminated by computer generated enhancement, described further hereinbelow. Alternatively, either of these difficulties inherent to apertures may be overcome in the present invention by first examining image 22 projected on sensor surface 20 by collimated beam 14, before placing lens 12 in location for testing. This image, or more accurately the size, shape, and optionally the location information about this image, gathered by CCD 21, is sent to and stored in memory of the IPU 24. Similarly, a reference signal could be determined by knowing the size and shape of the collimated beam of light, since in such case, when no lens is in place, as long as the sensor surface is perpendicular to the collimated light beam, the size and shape of the image 22 will equal the size and shape of the collimated light beam. Subsequently, this information may be used as a baseline, or reference signal, for comparison with the image 22 projected or signals produced when the lens 12 is inserted. The difference between the two images or signals may be converted into values representing the optical properties of lens 12.

The test lens 12 need not necessarily be centered exactly over the aperture 16. If lens 12 is located slightly off center, or if lens 12 is not perfectly perpendicular to the collimated light 14, projected image 22 may be refracted onto sensor surface 20 slightly off center, but, by calculating the location of the center of the projected image, the IPU 24 may still accurately calculate optical parameters.

When lens 12 is inserted into the path of collimated light at the test plane, the collimated light is converged or diverged according to whether lens 12 is positive or negative, respectively. The magnitude of this convergence or divergence is proportional to the power of the lens. The power of lens 12 in a given direction can be determined using elementary trigonometry and evaluating the diameter of the image 22 along a line corresponding to the given direction, as will be discussed further hereinbelow.

There are a variety of methods which can be used to convert the information gathered by the sensor board into optical properties. How one chooses to use the conventional analytical techniques, algorithms, and geometric relationships is largely a matter of design choice. Preferred algorithms generally are capable of determining the shape of the refracted image in the presence of dust, scratches and other obstructions or imperfections associated with a given lens.

In the preferred embodiment of the invention, the IPU 24 generally determines lens powers using the following sequence of steps:

- 1) (Steps 1 through 3 are preferably performed in the EPU) Using the apparatus described hereinabove, an image is projected onto the sensor surface either to test a lens or to form a baseline ("zero" the instrument), as mentioned above. In either case, the information gathered by each pixel which receives light is digitized into a series of values representing an x and y position for that pixel, and an intensity value for the amount of light received by that pixel. This is the initial image sent to the EPU for processing;

2) (steps 2 and 3 involve a multi-step edge detection process utilizing image processing techniques which uses the digitized location information from step 1 to determine which pixels form the boundary of the image on the sensor surface, (see, for example, Digital Image Processing, William K. Pratt, p. 491-556, John Wiley & Sons, 1991). A preferred sequence of image processing involves convolving the digitized location parameters from step 1, above, with two 11 by 11 operators, operator 1 being described by the following equation;

$$O_1[i,j] = \frac{j}{\sqrt{i^2 + j^2}} e^{-\frac{i^2+j^2}{2s^2}}$$

and operator 2 being described by the following equation:

$$O_2[i,j] = \frac{i}{\sqrt{i^2 + j^2}} e^{-\frac{i^2+j^2}{2s^2}}$$

where i and j are the operator coordinates, s is a scaling variable, preferably equal to 2, and the resultant image is the magnitude of these two intermediate results. This, if 2 is the scaling variable, operator [1]=

```
{0, −1, −1, −2, −3, −3, −3, −2, −1, −1,  0,
 0, −1, −3, −4, −6, −7, −6, −4, −3, −1,  0,
−1, −2, −4, −7, −11, −12, −11, −7, −4, −2, 0,
−1, −1, −3, −15, −15, −18, −15, −9, −5, −2, −1,
 0, −1, −3, −15, −15, −23, −15, −15, −3, −1, 0,
 0,  0,  0,  0,  0,  0,  0,  0,  0,  0,  0,
 0,  1,  3, 15, 15, 23, 15, 15,  3,  1,  0,
 1,  2,  5,  9, 15, 18, 15,  9,  5,  2,  1,
 1,  2,  4,  7, 11, 12, 11,  7,  4,  2,  1,
 0,  1,  3,  4,  6,  7,  6,  4,  3,  1,  0,
 0,  1,  1,  2,  3,  3,  3,  2,  1,  1,  0}
``` and operator [2]=

```
{ 0,  0, −1, −1,  0, 0, 0,  1,  1, 0, 0,
 −1, −1, −2, −2, −1, 0, 1,  2,  2, 1, 1,
 −1, −3, −4, −5, −3, 0, 3,  5,  4, 3, 1,
 −2, −4, −7, −9, −15, 0, 15, 9,  7, 4, 2,
 −3, −6, −11, −15, −15, 0, 15, 15, 11, 6, 3,
 −3, −7, −12, −18, −23, 0, 23, 18, 12, 7, 3,
 −3, −6, −11, −15, −15, 0, 15, 15, 11, 6, 3,
 −2, −4, −7, −9, −15, 0, 15, 9,  7, 4, 2,
 −1, −3, −4, −5, −3, 0, 3,  5,  4, 3, 1,
 −1, −1, −2, −2, −1, 0, 1,  2,  2, 1, 1,
  0,  0, −1, −1,  0, 0, 0,  1,  1, 0, 0,}
```

Using the above described operators 1 and 2, the initial digitized location parameters are convolved with operator 1 to form image 0 parameters; the initial digitized location parameters are convolved with operator [2] to form image 1 parameters; and image 2 digital signal parameters are then calculated using the relationship $$P_2 = \sqrt{P_1^2 + P_0^2},$$

where $P_2$, $P_1$, and $P_0$ refer to digital signals from each of the corresponding pixel elements of image 2, image 1, and image 0, respectively. The resultant image 2 digitized location information is then used for step 3, described hereinbelow.

An alternative preferred sequence of convolution operations which is generally more efficient computationally but gives slightly different results, involves first convolving the initial image parameters with an 11×11 operator described by the equation;

$$O[i,j] = e^{-\frac{i^2+j^2}{2s^2}}$$

to form an image 0 series of digital signal parameters. An image 1 series of digital signal parameters is then formed by convolving the image 0 parameters by the following Prewitt operator:

| | | |
|---|---|---|
| −1, | 0, | 1 |
| −1, | 0, | 1 |
| −1, | 0, | 1; |

An image 2 series of digital signal parameters is formed by convolving the image 0 parameters by the following Prewitt operator:

| | | |
|---|---|---|
| −1 | −1 | −1 |
| 0 | 0 | 0 |
| 1 | 1 | 1. |

The resultant image 3 series of digital signal parameters may then be calculated using the relationship $$p_3 = \sqrt{p_2^2 + p_1^2},$$

where $p_3$, $p_2$, and $p_1$ correspond to digital signals from the pixels of image 3, image 2, and image 1, respectively. The resultant image 3 parameters are then used for step 3 described hereinbelow.

However, before step 3 is performed, the resultant digitized image information, regardless of which convolution technique described above has been employed, is preferably improved by a thresholding operation in which only pixels having an intensity value above a certain threshold value are used for further processing. This threshold value is typically determined by system parameters set during design.

3) gray-level skeleton image processing is used to find the pixels of the resultant image from step two above, which have the maximum intensity and, in effect, are the pixels forming the boundary of the original image. Grey level skeleton imaging is described in "From Binary to Grey Tone Image Processing Using Fuzzy Logic Concepts", by Vartkis Goetcherian, Pattern Recognition, Vol. 12, pages 7 through 17. These peak values correspond to the points of greatest intensity of the final image produced by step 2 above; the digitized location information for these maximum intensity pixels is used in the remaining steps, as will be described hereinbelow.

4) (Steps 4 through 7 are preferably performed by the D.S.P.) Since the area being examined is an ellipse, the area may be represented using the polynomial:

$$ax^2 + bxy + cy^2 + dx + ey + f = 0$$

This polynomial is useful because it lends itself to least squares analysis, a means by which a large number of data points around the edge of the spot can be used for averaging to determine the shape and location of the ellipse. Consequently, using least-squares curve fitting and Gaussian elimination methods, the x and y coordinates of the maximum intensity pixels from step (3) above are used to satisfy the conditions of the above polynomial. As illustrated in FIG. 3, the variables x and y are the locations of ellipse edge pixels, that is, pixels on the edge of the elliptical projected image 22 and a, b, c, d, e, and f are coefficients to be determined. These coefficients are then used to determine the locus of the center of the ellipse, the major and minor axes of the ellipse (identified in FIG. 3 by $s_1$ and $s_2$, respectively) and the orientation angle of these axes with respect to the sensor surface.

5) An enhancement step is performed in which each ellipse edge pixel is evaluated on an individual basis to see how well it fits the resulting polynomial. Normally, the resulting polynomial value produced by inputting the (x,y) locations of any particular ellipse edge pixel will not be zero. Consequently, the polynomial value produced by the x,y coordinates for a particular ellipse edge pixel is used to represent the amount of error in that particular pixel (thus, the larger the polynomial value, the more error), and thus to determine how well each one fits the polynomial. Poorly fitting pixels, i.e., pixels which result in a polynomial value that exceeds a chosen value, are rejected. Step 4 above is then repeated using the remaining pixels to calculate a new polynomial, after which step 5 is repeated, and so on until sufficient accuracy is achieved and none of the ellipse edge pixels are rejected. The results may then be reported, displaying the accuracy achieved, and/or alternatively indicating whether dirt or poor lens quality is present. This enhancement step may thus be used to detect and correct for insignificant lens defects, dirt, imperfect aperture shapes, etc.

6) The polynomial coefficients are calculated and then converted to elliptical parameters in terms of pixel units. For example, using the equations listed in pages 41–44 of Mathematical Handbook for Scientists and Engineers, 2nd Edition, Granino A. Korn, published by the McGraw-Hill Book Company, the polynomial coefficients may be used to determine the locus of the center of the ellipse and the major and minor axes and the orientation angle of these axes with respect to the sensor surface.

7) By knowing (or measuring) the size of the pixel units on the sensor board the elliptical parameters described in pixel units may be converted to elliptical parameters in physical units of measure.

Figure 6:
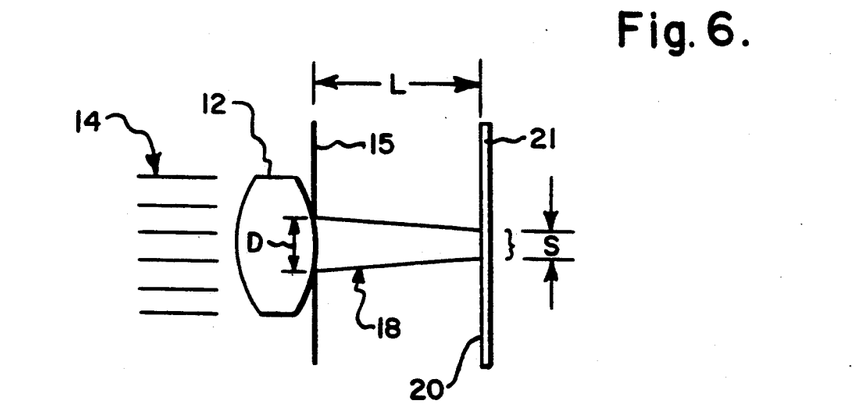
FIG. 6 is a schematic view illustrating the convergence of light by a positive lens located against an aperture of the type illustrated in FIG. 2 and onto the sensor surface.

8) (Step 8 may be performed by the CPU, DSP, or another coprocessor) These physical parameters are then converted to the desired optical properties or parameters, using a suitable equation. Where the lens is placed against the aperture, between the light source and the aperture, as illustrated in FIG. 6, the relationship will be:

$$S = D \times (1 - \Theta \times L), \text{ or } \Theta = (D - s)/DL$$

where 'D' is the diameter of the aperture (when no test lens or correction lens is in place, D will also be the diameter of the refracted image), 'L' is the distance from the sensor to the aperture, and 's' is the diameter of the projected image created by a lens of power 'Θ' in the direction being measured.

The above equation may be used to convert the major and minor axis dimensions determined from the polynomial coefficients to the required spherical and cylindrical powers. The minor axis of the ellipse would correspond to the spherical power, and the difference between the major and minor axis would correspond to positive cylindrical power according to this equation. For example, in the case of the image illustrated in FIG. 3, the minor axis $s_0$ of the ellipse would be used first to determine the spherical power of the lens being tested, while the major axis $s_1$ would be used to determine the total of both the spherical and cylindrical powers of the lens being tested. Then, by subtracting the power along $s_0$ from the power along $s_1$, the cylindrical power may be calculated. Information concerning the distance parameters may be manually entered into the IPU 24, or alternatively an automatic measuring system may be installed that reports these values to the IPU 24.

Figure 7:
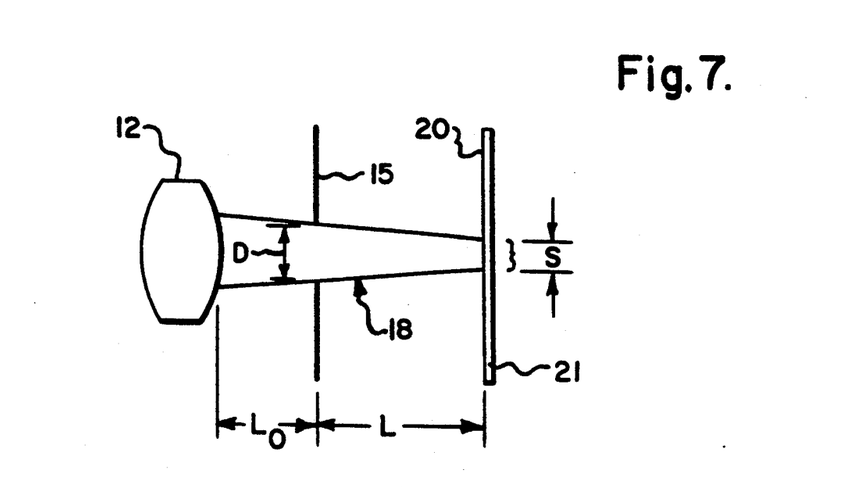
FIG. 7 is a schematic view illustrating the convergence of light by a positive lens located away from an aperture of the type illustrated in FIG. 2 and onto the sensor surface.

It should be noted that the above is an example for illustrative purposes only. Thus, lens 12 need not necessarily be placed against aperture 15, as in FIG. 6, but rather may be located away from aperture 15, as in FIG. 7, in which case the physical parameters would be converted to optical properties or parameters using the following relationship:

$$\Theta = \frac{s - D}{L_0(s - D) - DL}$$

where 'D' is the diameter of the aperture, 'L' is the distance from the sensor to the aperture, '$L_0$' is the distance from the lens to the aperture, and 's' is the diameter of the projected image created by a lens of power 'Θ' in the direction being measured.

The property of a lens to bend light without changing vergence is called prism. Prism may be calculated from the displacement of the position of the refracted image from the position of the unrefracted image.

As mentioned above, in the preferred embodiment, all of the calculations described above take place in the IPU 24, the first three of the above steps being performed by the elliptical processing unit, steps 4 through 7 being performed by the digital signal processor, and step 8 being performed by the central processing unit. However, it is not critical that all of these operations take place at these locations, and thus similar designs could function properly using fewer or more co-processors, or doing the above steps in different locations, for example, without departing from the scope of the invention.

The process described immediately above can also be used to compare a reference image with a lens image. For example, a reference lens could be analyzed, or the lens could be completely removed, and the resulting reference parameters of image 22 measured and stored. When a lens is then measured the resultant image 22 would have a corresponding set of physical or optical parameters from which the reference parameters could be removed. This could be accomplished by using a technique for combining oblique cylindrical lenses, explained in "Mirrors, Prisms, and Lenses", James Southall, published by The MacMillan Co., pages 320-327. If the lens characteristics are combined with the neutralizing characteristics of the reference (the optical negative) using this technique, the true lens power can be determined. This method can also be used to correct for system errors which can be represented by elliptical parameters, such as misalignment of the optical path, elliptical (rather than circular) shaped apertures, misaligned apertures, and non-square pixel sampling of the image.

The invention is more easily comprehended by reference to specific embodiments which are representative of the invention. It must be understood, however, that the specific embodiments are provided only for purposes of illustration, and that the invention may be practiced otherwise than as specifically illustrated without departing from its spirit and scope.

EXAMPLE 1

A sensor surface is provided having a 512×512 array of pixels located on $15\times10^{-6}$ m. centers, thus having a sensor area about 7.68 mm square, or 58.98 mm². The sensor surface is located 40 mm from an aperture having a diameter of 3.84 mm. A collimated light beam is projected through the aperture onto the sensor surface. A test lens is then be placed at the aperture, and the diameter of the image projected onto the sensor surface by the collimated light beam is measured. The power of the lens may then be calculated using the process described hereinabove. For example, the power of a lens (in a given direction) which projects an image having a diameter 's' of about 0.768 mm, or 160 pixels (in the given direction) may be calculated using the equation set forth above, as follows:

$$\Theta = (D - s)/DL = (.00384 - .000768)/(.00384 \times .040)$$
$$\Theta = 20 \text{ diopters.}$$

Similarly, the power of a lens projecting an image having a diameter 's' of about 1445 pixels, or 6.912 mm, would be $$\Theta = (D - s)/DL = (.00384 - .006912)/(.00384 \times .040)$$
$$\Theta = -20 \text{ diopters.}$$

The accuracy of these calculations depends on the type of sensor surface used, distance from the aperture, aperture size, etc., and is primarily a function of the diameter of the refracted image 's' and the particular type of sensor surface being used. So, for example, in the above example, if, because of noise inherent in the sensor, the location of any individual pixel is was accurate to within ±3 pixels, the percent error of any particular measurement could be determined by the relationship:

$$\text{ERROR} = \pm 3/\sqrt{n} \ ;$$

where 'n' is the number of pixels involved in the measurement of the image. Thus, if the sensor surface in the example above was accurate to ±3 pixels, the lens having a power of +20 diopters would have an accuracy of up to about $$\pm 3/\sqrt{160}$$

pixels (or approximately 0.04 diopters), while the lens having a power of −20 diopters would have an accuracy of up to about $$\pm 3/\sqrt{1445} = .08$$

pixels. It is evident from these calculations that the present invention exhibits less accuracy for strong positive lenses than for strong negative lenses.

EXAMPLE 2

In an alternative preferred embodiment or the invention, which is more accurate than the set up of Example 1, a sensor surface identical to that of Example 1 is located 30 mm from an aperture having an opening therein of 4.5 mm. With this embodiment, in comparison with Example 1. a lens having a power of +20 diopters in a given direction would result in an image diameter 's'=1.8 mm, or about 376 active pixels, and an accuracy to within about 0.154 pixel or 0.02 diopters.

EXAMPLE 3

A sensor surface is provided having a 500×500 array of rectangular pixels thereon, resulting in a sensor surface approximately 3.15 mm high×4.9 mm wide. The sensor surface is located 30 mm away from an aperture having a 3 mm diameter.

It would be desireable to implement a correction lens into the system, capable of altering the reflected image so that the rectangular sensor surface would be identically accurate in all directions. One way of doing so is by providing a correction lens between the aperture and the sensor surface, with both spherical and cylindrical power. The spot size on the sensor surface would be 1.88 mm vertical and 2.87 mm horizontal. The power of a lens needed to achieve this alteration to the 3 mm collimated light beam is calculated as follows:

$$\text{vertical power} = \Theta_v = \frac{(D - s)}{DL} = \frac{(.003 - .00188)}{(.03 \times .003)} = 12.44$$

$$\text{horizontal power} = \Theta_h = \frac{(D - s)}{DL} = \frac{(.003 - .00287)}{(.03 \times .003)} = 1.44$$

Thus, a correction lens having a vertical power of 12.44 diopters, and a horizontal power of 1.44 diopters, would have to be implemented.

What is claimed is:

1. A device without a moving part for determining optical properties of a lens comprising, means to project a beam of light along a path having an axis, a test plane located on said path, an occluder having a single shaped opening defined by a single border positioned on said path, area detection means responsive to light received from said shaped opening for providing a signal representative of light distribution on said detection means, evaluation means for converting said signal to values representing the optical properties of a lens located at said test plane, and means to report said values.

2. The device according to claim 1, further including a modifying lens between said test plane and said area detection means for adjusting the light distribution on said area detection means.

3. The device according to claim 2, wherein said modifying lens is selectively positionable on said path for adjusting the light distribution on said area detection means.

4. The device according to claim 1, wherein said signal represents the size and shape of light distribution on said detection means.

5. The device according to claim 4, wherein said reporting means reports sphere, cylinder and axis values of a tested lens.

6. The device according to claim 4, wherein said reporting means reports the deviation from a true sphero-cylindrical lens.

7. The device according to claim 1, wherein said signal represents the size, shape and location of light distribution on said detection means.

8. The device according to claim 7, wherein said reporting means reports sphere, cylinder, axis and prism values of a tested lens.

9. The device according to claim 1, wherein said evaluation means includes a central processing unit.

10. The device according to claim 1, wherein said means to project a beam of light along a path includes a light source and a pin hole occluder.

11. The device according to claim 1, wherein said means to project a beam of light along a path includes a collimated light source.

12. The device according to claim 11, wherein said means to project a beam of light along a path includes a laser.

13. The device according to claim 11, wherein said area detection means includes a charge injection device or a charge couple device.

14. The device according to claim 1, wherein said area detection means includes a charge injection device or a charge couple device.

15. The device according to claim 1, wherein said reporting means includes a visual display.

16. The device according to claim 15, wherein said reporting means displays the deviation from a true sphero-cylindrical lens.

17. The device according to claim 1, further including memory means for storing reference information and said signal is representative of the size and shape of light distribution on said detector.

18. The device according to claim 17, wherein said memory means stores information representative of said occluder diameter and the distance between said test plane and said detection means.

19. The device according to claim 18, wherein said memory means stores reference information representative of the size and shape of said beam on said detection means without a lens in said test plane.

20. The device according to claim 18, wherein said memory means stores information representative of the size, shape and location of said beam on said detection means without a lens in said test plane.

21. The device according to claim 20, further including means to automatically determine the size and shape of the beam and store said reference information each time said device is turned on.

22. The device according to claim 18, wherein said memory means stores information representative of the size, shape and intensity of said beam on said detection means without a lens in said test plane.

23. The device according to claim 18, wherein said memory means stores information representative of the size, shape and intensity of said beam on said detection means with a lens in said test plane.

24. The device according to claim 23, wherein said local intensity of said beam on said detection means is used to detect defects in said lens.

25. The device according to claim 1, wherein said shaped opening is in the shape of an ellipse.

26. The device according to claim 1, wherein said single shaped opening is a pinhole aperture.

27. An instrument for determining the optical properties of a lens comprising, an illumination source, a path extending from said source, means for projecting a beam of light along said path, a test plane located on said path, area detection means for receiving light from said test plane and producing a first signal representing the size and shape of light distribution on said detection means, means for producing an edge coordinate signal from said first signal utilizing an edge determining algorithm, evaluation means for comparing said edge coordinate signal to a reference signal and converting a difference between said signals to values indicating optical properties of a lens located at said test plane, and means to report said values.

28. The device according to claim 27 further including a modifying lens between said test plane and said area detection means for adjusting the light distribution on said area detection means.

29. The device according to claim 28, wherein said modifying lens is selectively positionable on said path for adjusting the light distribution on said area detection means.

30. The device according to claim 27, wherein said first signal represents the size, shape and location of light distribution on said detection means.

31. The device according to claim 30, wherein said reporting means reports sphere, cylinder, axis and prism values of a tested lens.

32. The device according to claim 27, wherein said evaluation means includes a central processing unit.

33. The device according to claim 27, wherein said means to project a beam of light along a path includes a light source and a pin hole occluder.

34. The device according to claim 27, wherein said means to project a beam of light along a path includes a collimated light source.

35. The device according to claim 34, wherein said means to project a beam of light along a path includes a laser.

36. The device according to claim 27, wherein said area detection means includes a charge injection device or a charge couple device.

37. The device according to claim 27 wherein said signal represents the size and shape of light distribution on said detection means.

38. The device according to claim 37, wherein said reporting means reports the deviation from a true sphero-cylindrical lens.

39. The device according to claim 27, wherein said reporting means includes a visual display.

40. The device according to claim 39, wherein said reporting means displays the deviation from a true sphero-cylindrical lens.

41. The device according to claim 27, wherein said reporting means reports sphere, cylinder and axis values of a tested lens.

42. The device according to claim 27, further including memory means for storing reference information and said signal is representative of the size and shape of light distribution on said detector.

43. The device according to claim 42, wherein said memory means stores information representative of the distance between said test plane and said detection means.

44. The device according to claim 43, wherein said memory means stores reference information representative of the size and shape of said beam on said detection means without a lens in said test plane.

45. The device according to claim 43, wherein said memory means stores information representative of the size, shape and location of said beam on said detection means without a lens in said test plane.

46. The device according to claim 45, further including means to automatically determine the size and shape of the beam and store said reference information each time said device is turned on.

47. The device according to claim 43, wherein said memory means stores information representative of the size, shape and local intensity of said beam on said detection means without a lens in said test plane.

48. The device according to claim 13, wherein said memory means stores information representative of the size, shape and local intensity of said beam on said detection means with a lens in said test plane.

49. The device according to claim 48, wherein said local intensity of said beam on said detection means is used to detect defects in said lens.

50. The instrument according to claim 27, further comprising an occluder having an aperture positioned on said path.

51. A method of determining optical properties of a lens which comprises,
projecting a collimated beam of light through a test plane onto an occluder having a central shaped opening,
producing a first signal representative of the size and shape of a detector area illuminated by a small bundle of rays passing through said shaped opening,
processing said first signal utilizing an edge determining algorithm to produce an edge coordinate reference signal,
storing said reference signal,
placing a lens to be evaluated at said test plane to refract said beam,
producing a second signal representative of the size and shape of said detector area illuminated by another bundle of rays from said refracted beam passing through said shaped opening,
processing said second signal utilizing an edge determining algorithm to produce an edge coordinate test signal,
comparing said reference and test signals to determine optical properties of said lens, and
reporting said properties.

52. The method according to claim 51, wherein said optical properties are sphere, cylinder and axis values of said lens.

53. A method of determining optical properties of a lens which comprises,
projecting a collimated beam of light first through an occluder having a central shaped opening, then through a test plane,
producing a first signal representative of the size, shape and location of a detector area illuminated by a bundle or rays passing through said shaped opening,
processing said first signal utilizing an edge determining algorithm to produce an edge coordinate reference signal,
storing said reference signal,
placing a lens to be evaluated at said test plane to refract said beam,
producing a second signal representative of the size, shape and location of said detector area illuminated by another bundle of rays from said refracted beam passing through said shaped opening,
processing said second signal utilizing an edge determining algorithm to produce an edge coordinate test signal,
comparing said reference and test signals to determine optical properties of said lens, and
reporting said properties.

54. The method according to claim 53, wherein said optical properties are sphere, cylinder, axis and prism values of said lens.

55. A method of determining the optical properties of a lens which comprises,
A) projecting a beam of light through a test lens to provide a refracted beam of light,
B) illuminating an area detector having a plurality of rows, each row containing a plurality of pixels, with said refracted beam,
C) scanning each row of pixels to produce a digitized signal representative of crude physical parameters representing the size and shape of said illuminated area,
D) processing said digitized signal using an edge determining algorithm to produce a digitized edge coordinate signal,
E) converting said digitized edge coordinate signal into enhanced physical parameters representing the size, shape and location of said illuminated area, and
F) calculating optical properties of said lens using said enhanced physical parameters.

56. The method according to claim 55, wherein said edge determining algorithm includes convolving said digitized signal with an operator described by the equation:

$$O[i,j] = e^{-\frac{i^2+j^2}{2S^2}}$$

to produce an image zero series of digital signal parameters, convolving said image zero parameters with the following operator:

| | | |
|---|---|---|
| −1 | 0 | 1 |
| −1 | 0 | 1 |
| −1 | 0 | 1 | to form an image one series of digital signal parameters, convolving said image zero parameters with the following operator:

| | | |
|---|---|---|
| −1 | −1 | −1 |
| 0 | 0 | 0 |
| 1 | 1 | 1 | to form an image two series of digital signal parameters, calculating an image three series of digital signal parameters using the relationship $$p_3 = \sqrt{p_2^2 + p_1^2}$$

where $p_3$, $p_2$, and $p_1$ correspond to digital signals from the pixels of said image three, image two, and image one, respectively, and processing said image three parameters using grey-level skeleton image processing.

* * * * *